US011333513B2

(12) United States Patent
Mukai et al.

(10) Patent No.: US 11,333,513 B2
(45) Date of Patent: May 17, 2022

(54) ROUTE SEARCHING APPARATUS AND BATTERY INFORMATION MANAGING APPARATUS

(71) Applicant: HONDA MOTOR CO., LTD., Tokyo (JP)

(72) Inventors: Masato Mukai, Wako (JP); Masahiro Kuroki, Wako (JP); Akihisa Otsuka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 83 days.

(21) Appl. No.: 16/273,949

(22) Filed: Feb. 12, 2019

(65) Prior Publication Data

US 2019/0178663 A1 Jun. 13, 2019

Related U.S. Application Data

(63) Continuation of application No. PCT/JP2017/026009, filed on Jul. 19, 2017.

(30) Foreign Application Priority Data

Sep. 30, 2016 (JP) .............................. JP2016-193355

(51) Int. Cl.
*G01C 21/34* (2006.01)
*G01C 21/36* (2006.01)
(Continued)

(52) U.S. Cl.
CPC .......... *G01C 21/3469* (2013.01); *B60L 53/80* (2019.02); *B60L 58/12* (2019.02);
(Continued)

(58) Field of Classification Search
CPC ................ G01C 21/3469; G01C 21/34; G01C 21/3476; G01C 21/3676; G01C 21/3679;
(Continued)

(56) References Cited

U.S. PATENT DOCUMENTS 8,538,694 B2    9/2013  Conway
2011/0191266 A1* 8/2011  Matsuyama ........... G06Q 50/06
                                                    705/412
(Continued)

FOREIGN PATENT DOCUMENTS

JP    H06-048184 A    2/1994
JP    2002-181555 A   6/2002
(Continued)

OTHER PUBLICATIONS

International Search Report for PCT/JP2017/026009 dated Sep. 26, 2017 (partially translated).

(Continued)

*Primary Examiner* — Hunter B Lonsberry
*Assistant Examiner* — Elizabeth Yang
(74) *Attorney, Agent, or Firm* — Thomas | Horstemeyer, LLP

(57) ABSTRACT

A route searching apparatus for searching for a route through which a moving body which moves by electric energy from a changeable battery reaches a destination has a position obtaining unit configured to obtain a current position of the moving body; a predicting unit configured to predict a time of arrival at a battery changing station based on a position of the battery changing station; a stock information obtaining unit configured to obtain stock information of a changeable battery in the battery changing station at the time of arrival; an estimating unit configured to estimate a movable range based on a residual amount of a changeable battery mounted in the moving body; and a searching unit configured to search for a route through which the moving body reaches the destination via the battery changing station, based on the stock information and the movable range.

8 Claims, 7 Drawing Sheets

(51) Int. Cl.
  *B60S 5/06* (2019.01)
  *B60L 58/12* (2019.01)
  *B60L 53/80* (2019.01)
  *B60K 1/04* (2019.01)

(52) U.S. Cl.
  CPC ............... *B60S 5/06* (2013.01); *G01C 21/34* (2013.01); *G01C 21/3476* (2013.01); *G01C 21/3676* (2013.01); *G01C 21/3679* (2013.01); *B60K 1/04* (2013.01); *Y02T 10/70* (2013.01); *Y02T 10/72* (2013.01); *Y02T 90/16* (2013.01)

(58) Field of Classification Search
  CPC . B60L 58/12; B60L 53/80; B60S 5/06; B60K 1/04; Y02T 10/7005; Y02T 10/7275; Y02T 90/161
  See application file for complete search history.

(56) References Cited

U.S. PATENT DOCUMENTS

| | | | | |
|---|---|---|---|---|
| 2011/0246252 | A1* | 10/2011 | Uesugi | B60L 58/12 |
| | | | | 705/7.12 |
| 2011/0257879 | A1* | 10/2011 | Ishibashi | G01C 21/3676 |
| | | | | 701/533 |
| 2011/0288765 | A1 | 11/2011 | Conway | |
| 2012/0158229 | A1* | 6/2012 | Schaefer | G01C 21/3469 |
| | | | | 701/22 |
| 2012/0256588 | A1* | 10/2012 | Hayashi | B60L 3/12 |
| | | | | 320/109 |
| 2013/0046457 | A1* | 2/2013 | Pettersson | B60L 1/14 |
| | | | | 701/117 |
| 2014/0361745 | A1* | 12/2014 | Nishita | B60L 11/1844 |
| | | | | 320/109 |
| 2015/0354974 | A1* | 12/2015 | Takehara | G01C 21/3679 |
| | | | | 701/423 |
| 2016/0020445 | A1* | 1/2016 | Holtappels | B60L 3/12 |
| | | | | 429/61 |
| 2016/0232736 | A1* | 8/2016 | Holtappels | H01M 10/441 |
| 2017/0217319 | A1* | 8/2017 | Araki | G01B 21/16 |
| 2018/0345805 | A1* | 12/2018 | Hernandez Lopez | B60L 53/80 |

FOREIGN PATENT DOCUMENTS

| | | |
|---|---|---|
| JP | 2012-503468 A | 2/2012 |
| JP | 2012-152018 A | 8/2012 |
| JP | 2012-523551 A | 10/2012 |
| JP | 2014-078249 A | 5/2014 |
| JP | 2016-006400 A | 1/2016 |
| WO | 2010033517 A2 | 3/2010 |
| WO | 2018061415 A1 | 4/2018 |

OTHER PUBLICATIONS

Australian Office Action for Australian Patent Application No. 2017333573 dated Jan. 16, 2020.

* cited by examiner

| BATTERY ID | STATUS | CHARGE AMOUNT | RESERVATION TARGET | EXPECTED TIME OF DELIVERY |
|---|---|---|---|---|
| 0001 | CHARGE STOPPED | 20%(0.4kWh) | EV1 | 15:20 |
| 0002 | CHARGING | 70%(1.4kWh) | NONE | |
| 0003 | CHARGE COMPLETE | 100%(2kWh) | NONE | |
| 0004 | CHARGE COMPLETE | 100%(2kWh) | NONE | |
| 0005 | CHARGE STOPPED | 60%(1.2kWh) | EV2 | 15:40 |
| 0006 | CHARGING | 30%(0.6kWh) | NONE | |

302

| BATTERY ID | STATUS | CHARGE AMOUNT | RESERVATION TARGET | EXPECTED TIME OF DELIVERY |
|---|---|---|---|---|
| 0007 | CHARGING | 80%(1.6kWh) | NONE | |
| 0008 | CHARGING | 80%(1.6kWh) | NONE | |
| 0009 | CHARGE COMPLETE | 100%(2kWh) | EV4 | 15:20 |
| 0010 | CHARGE COMPLETE | 100%(2kWh) | EV3 | 15:10 |
| 0011 | CHARGE STOPPED | 60%(1.2kWh) | EV2 | 15:40 |

303

| BATTERY ID | STATUS | CHARGE AMOUNT | RESERVATION TARGET | EXPECTED TIME OF DELIVERY |
|---|---|---|---|---|
| 0012 | CHARGING | 100%(2kWh) | NONE | |
| 0013 | CHARGING | 100%(2kWh) | NONE | |
| 0014 | CHARGE COMPLETE | 100%(2kWh) | EV5 | 15:30 |
| 0015 | CHARGING | 40%(0.8kWh) | EV6 | 15:30 |
| 0016 | CHARGING | 0%(0kWh) | NONE | |

ROUTE SEARCHING APPARATUS AND BATTERY INFORMATION MANAGING APPARATUS

CROSS-REFERENCE TO RELATED APPLICATIONS

This application is a continuation of International Patent Application No. PCT/JP2017/026009 filed on Jul. 19, 2017, which claims priority to and the benefit of Japanese Patent Application No. 2016-193355 filed on Sep. 30, 2016, the entire disclosures of which are incorporated herein by reference.

TECHNICAL FIELD

The present invention relates to a route searching apparatus and a battery information managing apparatus.

BACKGROUND ART

Japanese Patent Laid-Open No. 6-48184 proposes changing a battery detachably mounted in a vehicle driven by electric power with a fully charged battery in a battery changing station. This proposition is made based on the background that the continuous cruising range (for example, about 100 km) of a battery-driven vehicle is shorter than that of a fossil-fuel-driven vehicle, and it takes at least 30 minutes to charge the battery. A long cruising range can be realized even with the current battery capacity by repetitively changing a changeable battery in the battery changing station.

SUMMARY OF INVENTION

To always stock fully charged changeable batteries in the battery changing station, it is necessary to excessively stock changeable batteries, and this decreases the operation rate of the changeable batteries. This decrease in operation rate increases the usage fee of the changeable batteries, so the user will pay the high fee. One aspect of the present invention provides a technique for improving the operation rate of the changeable batteries in the battery changing station.

The present invention has been made in consideration of the above problem, and an embodiment provides a route searching apparatus for searching for a route through which a moving body which moves by electric energy from a changeable battery reaches a destination, the apparatus comprising: a position obtaining unit configured to obtain a current position of the moving body; a predicting unit configured to predict a time of arrival at a battery changing station based on a position of the battery changing station; a stock information obtaining unit configured to obtain stock information of a changeable battery in the battery changing station at the time of arrival; an estimating unit configured to estimate a movable range based on a residual amount of a changeable battery mounted in the moving body; and a searching unit configured to search for a route through which the moving body reaches the destination via the battery changing station, based on the stock information and the movable range.

Other features and advantages of the present invention will become apparent from the description provided hereinafter with reference to the accompanying drawings. Note that the same reference numerals denote the same or similar components in the accompanying drawings.

BRIEF DESCRIPTION OF DRAWINGS

The accompanying drawings, which are incorporated in and constitute a part of the specification, illustrate embodiments of the invention and, together with the description, serve to explain the principles of the invention.

FIG. 3 is a view for explaining examples of battery information of the embodiment;

DESCRIPTION OF EMBODIMENTS

Figure 1:
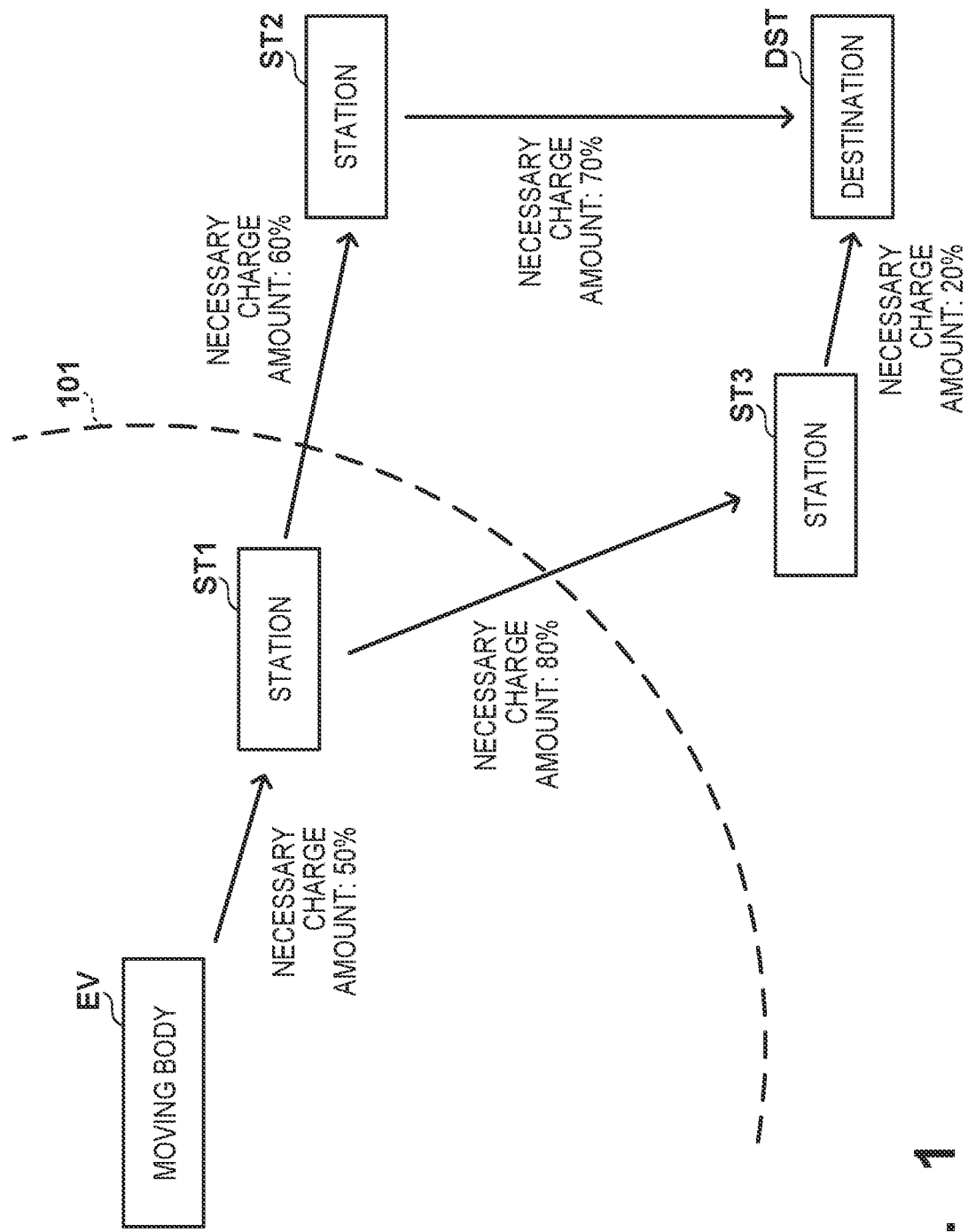
FIG. 1 is a view for explaining the geographical relationship between a moving body, stations, and a destination.

Embodiments of the present invention will be explained below with reference to the accompanying drawings. The same reference numerals denote the same elements throughout the various embodiments, and a repetitive explanation thereof will be omitted. Also, these embodiments can be changed and combined as needed.

An outline of some embodiments of the present invention will be explained with reference to FIG. 1. FIG. 1 shows the geographical relationship between a moving body EV, stations ST1 to ST3, and a destination DST. The moving body EV is a moving body (for example, a vehicle) which moves (for example, travels) by electric energy from a changeable battery, and is an electric vehicle, an electric bicycle, or the like. In the following explanation, a changeable battery will simply be called a battery. Each of the stations ST1 to ST3 is a facility which provides a service of changing a battery mounted in the moving body EV with another battery, and can also be called a battery changing station. The destination DST is a spot which the driver of the moving body EV wants to reach.

A broken line 101 in FIG. 1 indicates the limit of a range which the moving body EV can reach with the residual amount of the currently mounted battery. That is, the moving body EV can reach a position between the current geographical position (to be referred to as the current position hereinafter) of the moving body EV and the broken line 101. Also, each arrow in FIG. 1 indicates a battery charge amount required to move to the corresponding point. For example, a battery having a charge amount of 60% or more is necessary to move from the station ST1 to the station ST2. Also, it is impossible to directly reach the destination DST from the station ST1 even with a fully charged battery.

As shown in FIG. 1, the moving body EV cannot directly reach the destination DST with the residual amount of the currently mounted battery. Therefore, the driver of the moving body EV heads for the destination DST while changing batteries in the stations. More specifically, the moving body EV moves to the station ST1 within the reachable range, and changes the battery there. The moving body EV cannot directly reach the destination DST even when the battery is changed with a fully charged battery in the station ST1. Therefore, the moving body EV moves to the station ST2 closer to the destination DST than the station ST1, and changes the battery there. After that, the moving body EV moves from the station ST2 to the destination DST. When the moving body EV moves to the destination DST via the stations ST1 and ST2 in the order named as in this example, a new battery to be mounted in the moving body EV in the station ST1 need not be fully charged, and need only have a charge amount (60% in the example shown in FIG. 1) capable of reaching the station ST2.

It is generally known that the charging speed of a battery decreases near full charge ("near" is, for example, 80% or more of the capacity). Therefore, by providing a non-fully charged battery for the moving body EV in each station, it is possible to improve the battery operation rate in each station when compared to a case in which only fully charged batteries are provided. The station ST1 may also provide a battery change service with an amount of money corresponding to the battery charge amount, in order to encourage the use of a non-fully charged battery. For example, when the price of a fully charged battery is 500 yen, the station can provide a battery having a charge amount of A % by (500×A) yen. Instead, the station may also provide a battery by an amount of money calculated by a method which raises the price of a changeable battery as the charge amount of the battery increases. For example, the station can calculate an amount of money by 50 yen per 10% for a part where the charge amount is less than 80%, and calculate an amount of money by 75 yen per 10% for a part where the charge amount is 80% or more. For example, the amount of money of a battery having a charge amount of 90% is 80%×50 yen+10%×75 yen=475 yen. In a money amount system like this, the driver of the moving body EV increases an incentive to use a battery having a small charge amount. Consequently, the battery operation rate in each station improves, and the driver of the moving body EV can arrive at the destination DST with a low battery changing cost. In some embodiments of the present invention, therefore, when searching for a route from the current position of the moving body EV to the destination DST, the route is searched for by including a case in which the battery is changed with a battery having a predetermined charge amount (for example, a charge amount less than full charge) in each station. Details of an embodiment like this will be explained below.

Figure 2:
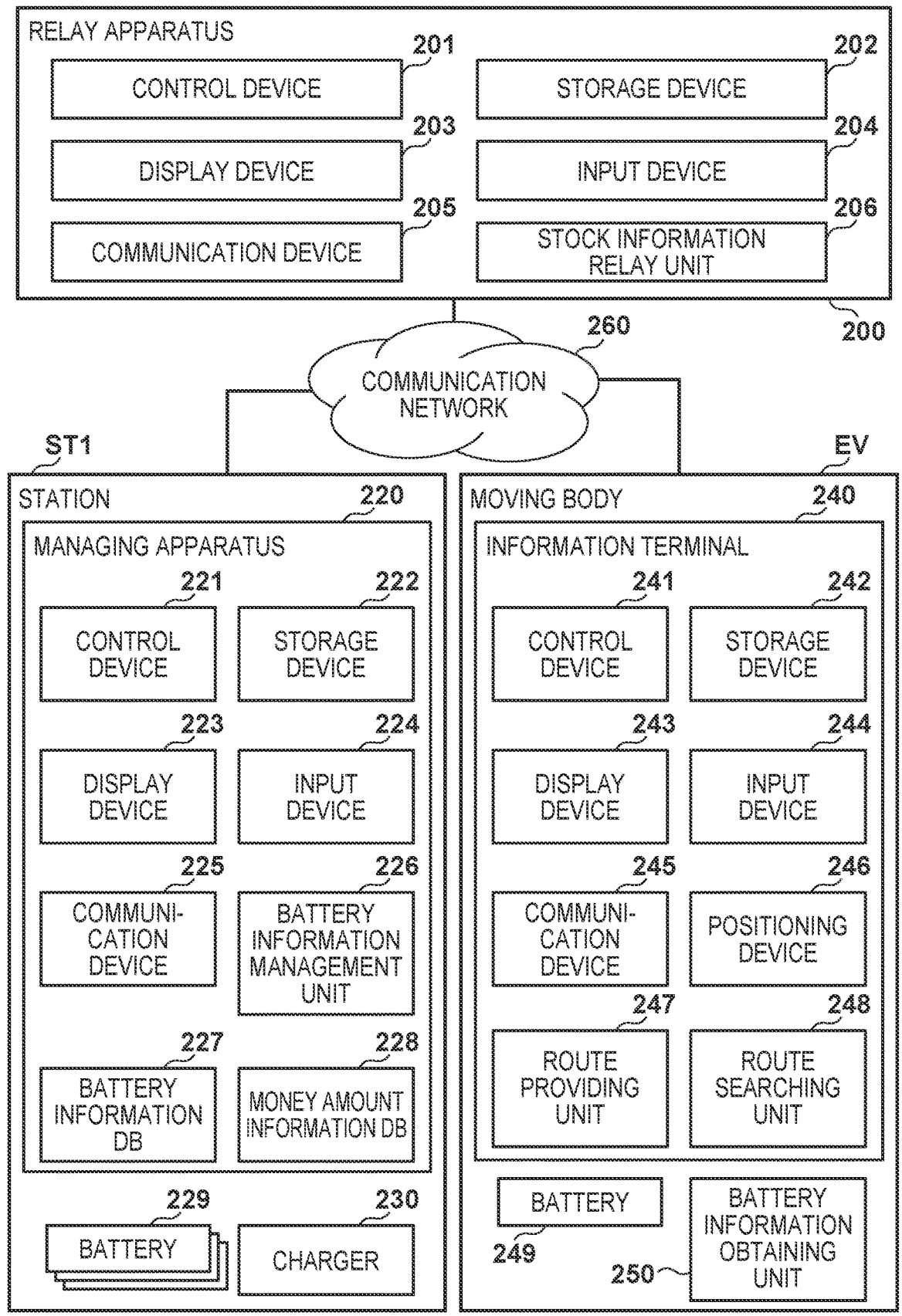
FIG. 2 is a block diagram for explaining configuration examples of a relay apparatus, a managing apparatus, and an information terminal of an embodiment.

A system for executing route search according to the embodiment of the present invention will be explained with reference to FIG. 2. This system includes, among others, a relay apparatus 200, a managing apparatus 220, and an information terminal 240. The relay apparatus 200, the managing apparatus 220, and the information terminal 240 are connected to a communication network 260. The communication network 260 can be the Internet, a private network, or the like. The arrangement of each of the relay apparatus 200, the managing apparatus 220, and the information terminal 240 will be explained in detail below.

The relay apparatus 200 obtains battery stock information from the managing apparatus 220 of each station in response to a request from the information terminal 240, and provides this stock information to the information terminal 240. The relay apparatus 200 is installed in a facility operated by the provider of this system. The managing apparatus 220 is a server computer or the like, and includes, among others, constituent elements shown in FIG. 2.

A control device 201 is a device for controlling the overall operation of the relay apparatus 200, and is a processor such as a CPU. A storage device 202 is a device for storing data necessary for the operation of the relay apparatus 200, and is a main storage device such as a memory. The storage device 202 can further include a secondary storage device such as a magnetic disk device. A display device 203 is a device for presenting information to the user (for example, an operator) of the relay apparatus 200, and is a liquid crystal display or the like. An input device 204 is a device for receiving information from the user of the relay apparatus 200, and is a keyboard, a mouse, or the like. A communication device 205 is a device for communicating (transmitting and receiving) data with the communication network 260, and is a network card or the like.

A stock information relay unit 206 obtains battery stock information from the managing apparatus 220 of each station in response to a request from the information terminal 240, and provides this stock information to the information terminal 240. The stock information is information of batteries which each station can provide for the moving body EV. A detailed operation of the stock information relay device 206 and practical examples of the stock information will be described later. The stock information relay unit 206 can be implemented by software such as a program, can be implemented by hardware (for example, a circuit) such as an ASIC (Application Specific Integrated Circuit), or can be implemented by a combination of software and hardware. When the stock information relay unit 206 is implemented by software, the control device 201 performs the operation of the stock information relay unit 206 by executing each instruction of the software (program) loaded into the storage device 202.

The managing apparatus 220 is installed in the station. In addition to the managing apparatus 220, one or more batteries 229 and a charger 230 for charging these batteries are installed in the station. In accordance with the providing status of the batteries 229, the station may temporarily store no battery 229. The managing apparatus 220 manages information of the batteries 229 to be stored in the station in which the managing apparatus 220 is installed. FIG. 2 shows the station ST1 as a representative station, but identical managing apparatuses 220 are installed in the stations ST2 and ST3. The managing apparatus 220 is a personal computer or the like, and includes, among others, constituent elements shown in FIG. 2.

A control device 221 is a device for controlling the overall operation of the managing apparatus 220, and is a processor such as a CPU. A storage device 222 is a device for storing data necessary for the operation of the managing device 220, and is a main storage device such as a memory. The storage device 222 can further include a secondary storage device such as a magnetic disk device. A display device 223 is a device for presenting information to the user (for example, a store clerk of the station ST1) of the managing apparatus 220, and is a liquid crystal display or the like. An input device 224 is a device for receiving information from the user of the managing apparatus 220, and is a keyboard, a mouse, or the like. A communication device 225 is a device for communicating (transmitting and receiving) data with the communication network 260, and is a network card or the like.

A battery information managing unit 226 manages information of the batteries 229 held in the station ST1. This information will be called battery information. A battery information DB 227 is a database for storing the battery information. A money amount information DB 228 is a database for storing money amount information containing a price (amount of money) when providing the battery 229. This information will be called money amount information. The money amount information can be either the same or different in the stations. The managing apparatus 220 executes management of the battery information, and hence can also be called a battery information managing apparatus. Details of the operation of the battery information managing unit 226 and practical examples of the battery information will be described later. The battery information managing unit 226 can be implemented by software such as a program, can be implemented by hardware (for example, a circuit) such as an ASIC, or can be implemented by a combination of software and hardware. When the battery information managing unit 226 is installed by software, the control device 221 performs the operation of the battery information managing unit 226 by executing each instruction of the software (program) loaded into the storage device 222.

The information terminal 240 provides a route guidance from the current position to the destination DST to the driver of the moving body EV. The information terminal 240 is associated with the moving body EV and moves together with the moving body EV. The information terminal 240 is a computer, for example, a car navigation device mounted in the moving body EV, or a portable communication terminal (for example, a cell phone, a smartphone, or a tablet) brought into the moving body EV by a passenger of the moving body EV. In addition to the information terminal 240, a battery 249 and a battery information obtaining unit 250 are mounted in the moving body EV. The battery information obtaining unit 250 can read the residual amount of the battery 249, and is an ECU of the power plant system of the moving body EV, for example. The information terminal 240 includes, among others, constituent elements shown in FIG. 2.

A control device 241 is a device for controlling the overall operation of the information terminal 240, and is a processor such as a CPU. A storage device 242 is a device for storing data necessary for the operation of the information terminal 240, and is a main storage device such as a memory. The storage device 242 can further include a secondary storage device such as a magnetic disk device. A display device 243 is a device for presenting information to the user (for example, the driver of the moving body EV) of the information terminal 240, and is a liquid crystal display or the like. In addition to the display device 243, the information terminal 240 can include a voice output device such as a speaker, and the voice output device can present information to the user. An input device 244 is a device for receiving information from the user of the information terminal 240, and is a touchpad or the like. The display device 243 and the input device 244 may also be implemented as an integrated device such as a touchscreen. A communication device 245 is a device for communicating (transmitting and receiving) data with the communication network 260, and includes a baseband circuit and an antenna. A positioning device 246 is a device for obtaining the current position of the information terminal 240, and is a GPS (Global Positioning System) receiver or the like. Since the information terminal 240 moves together with the moving body EV, the current position of the information terminal 240 can be regarded as the current position of the moving body EV.

A route providing unit 247 provides a route guidance to the user of the information terminal 240. A route searching unit 248 searches for routes from the current position of the moving body EV to the destination DST. The routes to be searched for include both a route which directly reaches the destination DST from the current position of the moving body EV, and a route which goes via one or more stations. Detailed operations of the route providing unit 247 and the route searching unit 248 will be descried later. The information terminal 240 executes route search, and hence can also be called a route searching apparatus. Each of the route providing unit 247 and the route searching unit 248 can be implemented by software such as a program, can be implemented by hardware (for example, a circuit) such as an ASIC, or can be implemented by a combination of software and hardware. When the route providing unit 247 and the route searching unit 248 are implemented by software, the control device 241 performs the operations of the route providing unit 247 and the route searching unit 248 by executing each instruction of the software (programs) loaded into the storage device 242.

Practical examples of the battery information will now be explained with reference to FIG. 3. Pieces of battery information 301 to 303 are practical examples of the battery information to be stored in the battery information DBs 227 of the stations ST1 to ST3. Each row in tables of the battery information 301 to 303 represents the battery information of one battery. "Battery ID" is an identification number uniquely assigned to each battery. "Status" indicates the status of charge of each battery by the charger 230. In particular, "charge stopped" indicates a state in which charge is stopped before the battery is fully charged. "Charge amount" indicates the charge amount of each battery. In the examples shown in FIG. 3, the battery information managing unit 226 manages the battery charge amount for every 10%. That is, if the battery charge amount is 0% or more to less than 10%, the charge amount is regarded as 0%, and so on. Instead of, or in addition to, indicating the charge amount by a relative value (%) with respect to full charge, the battery information can also indicate the charge amount by the absolute value (for example, Wh) of the capacity. In the examples shown in FIG. 3, the battery information indicates both the relative value and the absolute value. Since the absolute value of the capacity of full charge (100%) changes due to deterioration caused by the use of a battery, more accurate search can be performed by using the absolute value of the residual amount of the battery. "Reservation target" indicates the identification number of a moving body having reserved each battery. If "reservation target" of a battery is "none", the battery has no reservation. "Expected time of delivery" indicates the time at which a reserved battery is delivered to the user of a moving body.

Figure 4:
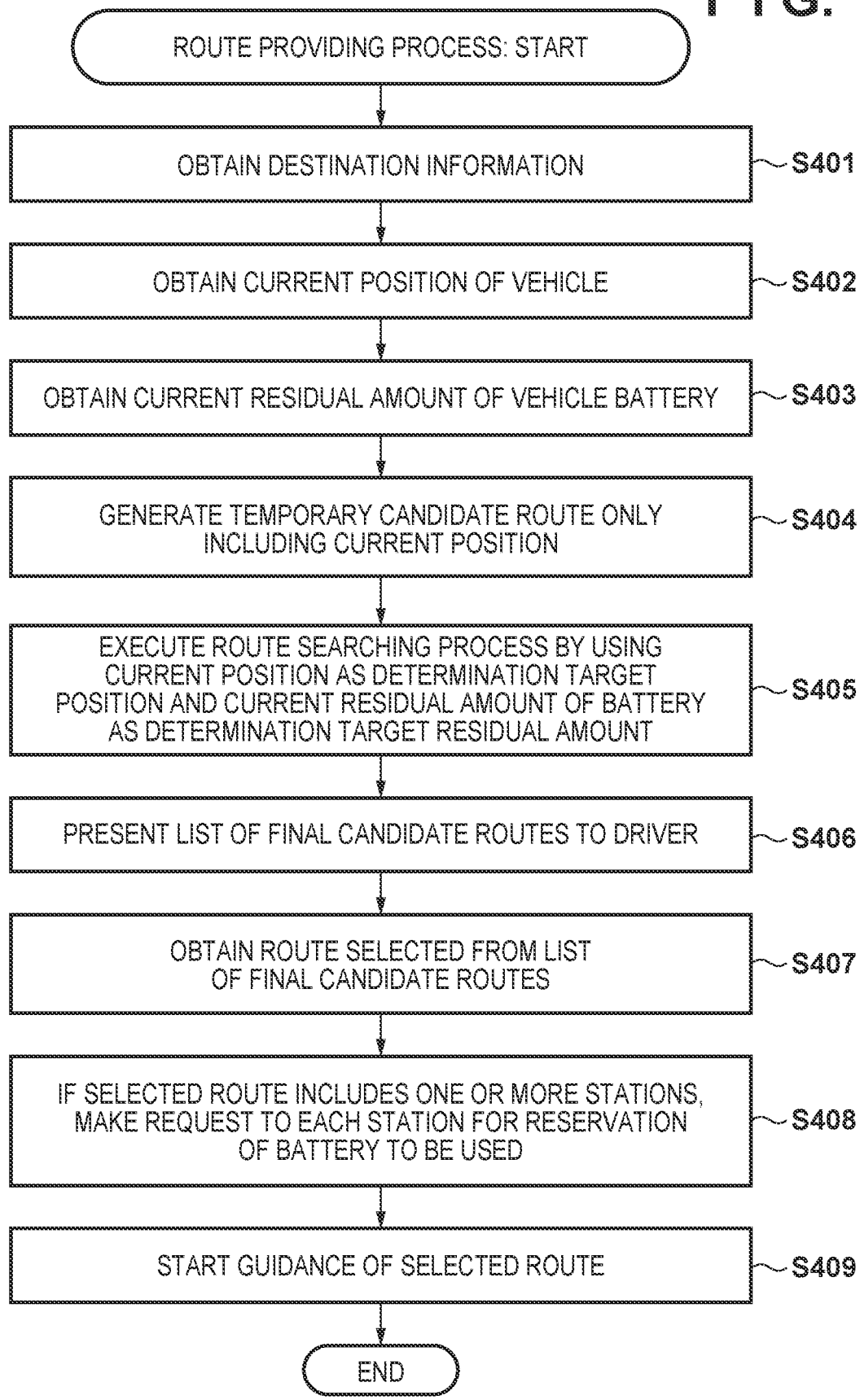
FIG. 4 is a flowchart for explaining an example of a route providing process of the embodiment.

Details of the route providing process performed by the information terminal 240 will be explained below with reference to a flowchart shown in FIG. 4. The route providing process is started when, for example, the user of the information terminal 240 instructs the information terminal 240 to start a route guidance by using the input device 244. The residual amount of a battery is obtained by a relative value (%) in the following explanation, but the battery residual amount may also be obtained by an absolute value (for example, Wh) instead.

In step S401, the route providing unit 247 obtains destination information input by the user of the information terminal 240 by using the input device 244. The destination information is information about the destination, and contains at least information indicating the position of the destination. This information indicating the position of the destination can be input by the name of the destination, and can also be input as a position on a map displayed on the display device 243 by the route providing unit 247. The destination information can further contain the residual amount (for example, 20%) of the battery 249, which must remain when the user arrives at the destination. If the residual amount which must remain is not designated, the route providing unit 247 may also use a default value (for example, 10%) as this residual amount. If a charger exists in the destination, the user of the information terminal 240 may also designate 0% as the residual amount which must remain.

In step S402, the route providing unit 247 obtains the current position of the information terminal 240 by using the positioning device 246. In step S403, the route providing unit 247 obtains the current residual amount of the battery 249. The route providing unit 247 may also obtain the residual amount obtained by the battery information obtaining unit 250. Instead, the route providing unit 247 may also obtain the residual amount manually input by the user by using the input device 244.

In steps S404 and S405, the route searching unit 248 performs route search. First, in step S404, the route searching unit 248 generates a temporary candidate route including only the current position obtained in step S402, and stores the temporary candidate route in the storage device 242. After that, in step S405, the route searching unit 248 executes a route searching process by using the current position as a determination target position, and the current charge amount of the battery as a determination target residual amount. The route searching process is a process of generating a final candidate route by extending the temporary candidate route to the destination obtained in step S401. There are a case in which one or more final candidate routes are generated, and a case in which no final candidate route is generated (that is, a case in which the moving body EV cannot reach the destination with the current residual amount of the battery 249 even when going via a station). Details of the route searching process will be described later.

In step S406, the route providing unit 247 presents a list of the final candidate routes to the user by using the display device 243. In step S407, the route providing unit 247 obtains a route (to be referred as a selected route hereinafter) selected from the final candidate route list by the user by using the input device 244. If the user has preset a route selection criterion (for example, a fastest route to the destination or a cheapest route to the destination), the route providing unit 247 may also omit steps S406 and S407, and select one route satisfying the selection criterion from the final candidate routes. Also, if no final candidate route is generated, the route providing unit 247 presents this information by using the display device 243. Accordingly, the user can perform a measure, for example, change the destination.

In step S408, if the selected route includes one or more stations, the route providing unit 247 transmits a reservation request for a battery having a charge amount scheduled to be used, to each station by using the communication device 245. The reservation request can be transmitted from the information terminal 240 to the managing device 220 either directly or via the relay apparatus 200. The operation of the managing apparatus 220 having received the reservation request will be described later. In step S409, the route providing unit 247 starts guiding the selected route for the user by using the display device 243.

Figure 5A:
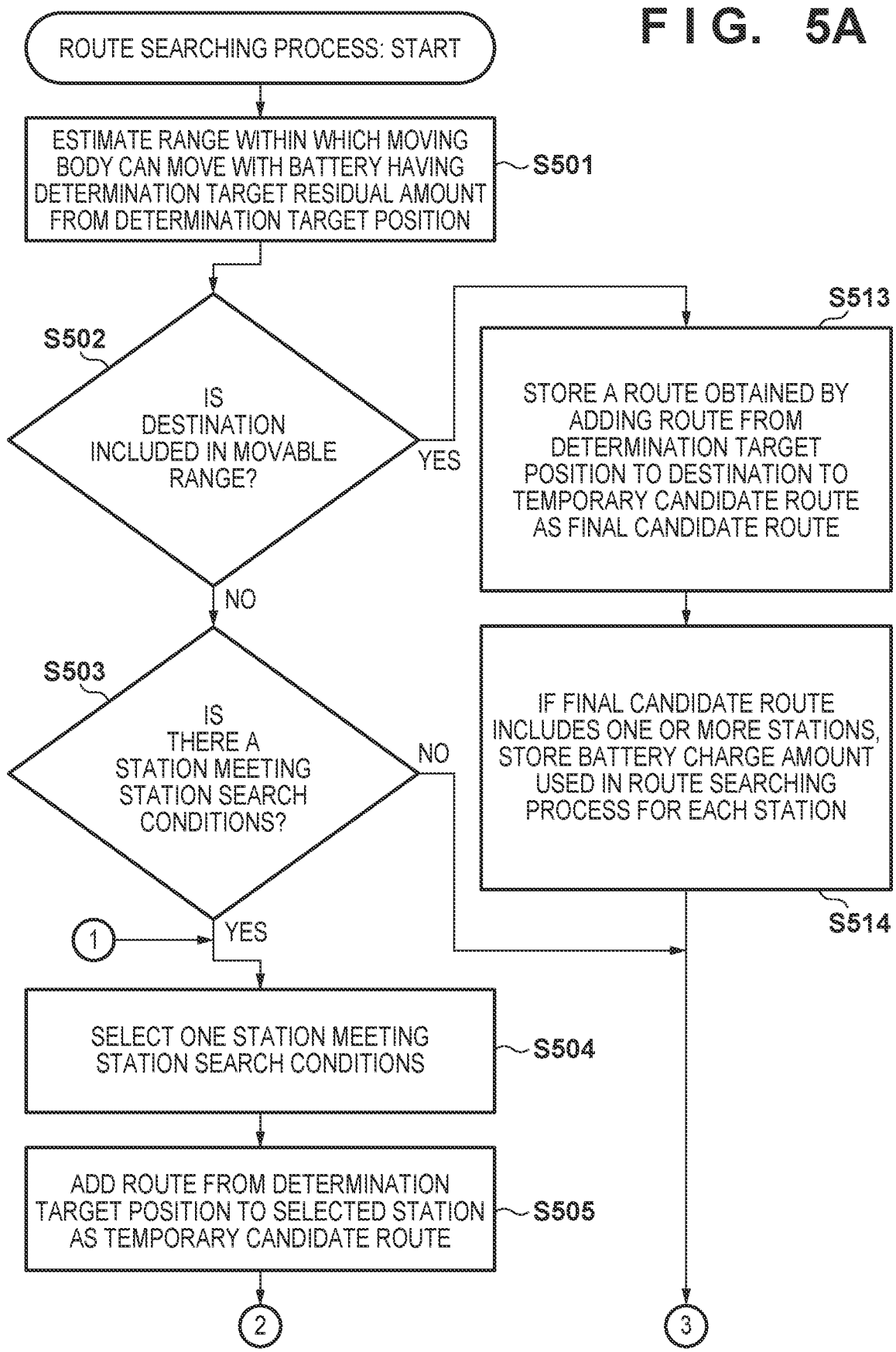
FIGS. 5A and 5B are flowcharts for explaining an example of a route searching process of the embodiment.
Figure 5B:
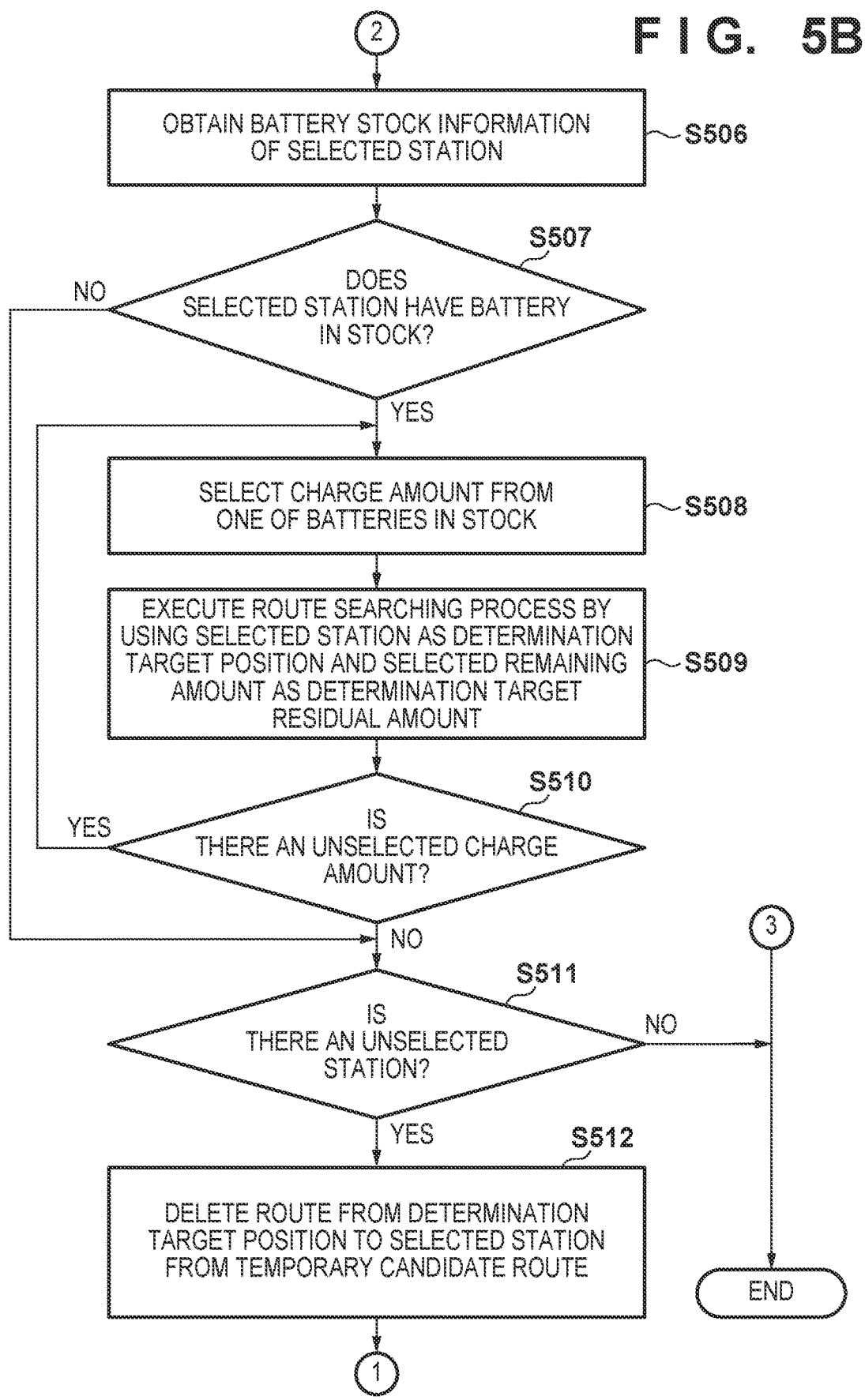

Details of the route providing process performed by the route searching unit 248 of the information terminal 240 will be explained below with reference to flowcharts shown in FIGS. 5A and 5B. The route providing process is recursively performed as will be explained below. At the start of this route providing process, a temporary candidate route includes only the current position of the moving body EV, a determination target position is the current position of the moving body EV, and a determination target residual amount is the residual amount of the battery 249 mounted in the moving body EV.

In step S501, the route searching unit 248 estimates a range within which the moving body EV can move with the battery having the determination target residual amount from the determination target position. This range will be called a movable range hereinafter. The movable range can be estimated based on a straight distance from the determination target position, and can also be estimated based on a moving distance along a road. Furthermore, the movable range can be corrected based on the driving tendency of the moving body EV or the road status, and can also be narrowed by the value of a safety factor.

In step S502, the route searching unit 248 determines whether the movable range estimated in step S501 contains the destination. If the movable range of the moving body EV contains the destination DST ("YES" in step S502), the route searching unit 248 advances the process to step S513, and sets a route heading for the destination DST as the final candidate route. If the movable range of the moving body EV does not contain the destination DST ("NO" in step S502), the route searching unit 248 advances the process to step S503, and searches for a route which goes via one or more stations.

First, processing when setting the route heading for the destination DST as the final candidate route will be explained. In step S513, the route searching unit 248 stores, in the storage device 242, a route obtained by adding the route from the determination target position to the destination to the temporary candidate route, as the final candidate route. In step S514, if the final candidate route includes one or more stations, the route searching unit 248 stores, in the storage device 242, the battery charge amount used in the route searching process for each station. The charge amount stored in this step is used in the reservation request in step S408 of FIG. 4 described above.

Next, processing when searching for a route which goes via one or more stations will be explained. In step S503, the route searching unit 248 determines whether there is a station meeting the conditions that the station is included in the movable range estimated in step S501 and positioned closer to the destination than the determination target position. These conditions will be called station search conditions hereinafter. The condition that the station is included in the movable range is a condition for enabling the moving body EV to reach the station. The condition that the station is positioned closer to the destination than the determination target position is a condition for limiting target stations of the recursive processing. If target stations of the recursive processing are not limited, even a station far from the destination becomes a target of the recursive processing, so the execution time of the route searching process prolongs. Instead of the condition that the station is positioned nearer the destination than the determination target position, the condition of limiting target stations of the recursive processing may also be another condition such as the condition that the station is included in a given range from the destination (for example, a range twice or less the distance from the destination to the current position of the moving body EV). If there is a station meeting the station search conditions ("YES" in step S503), the route searching unit 248 advances the process to step S504, and searches for a route from this station. If there is no station meeting the station search conditions ("NO" in step S503), the temporary candidate route cannot be extended any longer, so the route searching unit 248 terminates the process.

In step S504, the route searching unit 248 selects one of the stations found to satisfy the station search conditions in step S503. The station selected in this step will be called a selected station. In step S505, the route searching unit 248 adds a route from the determination target position to the selected station as a temporary candidate route.

In step S506, the route searching unit 248 transmits a request for the battery stock information of the selected station to the relay apparatus 200 by using the communication device 245. The stock information relay unit 206 of the relay apparatus 200 having received the request transmits the request to the managing apparatus 220 of the selected station by using the communication device 205. The battery information managing unit 226 of the managing apparatus 220 transmits information of a providable battery (that is, a battery for which "reservation target" is "none" and the charge amount is not 0%), of the battery information stored in the battery information DB, as stock information to the relay apparatus 200. For example, the battery information managing unit 226 adds "the battery ID" and "the charge amount" of the providable battery to the stock information. The stock information can contain information of not only a fully charged battery but also a battery having a charge amount less than full charge. The battery information managing unit 226 can further add a price (money amount information) when providing the battery to the stock information. If a plurality of batteries having the same charge amount can be provided, the battery information managing unit 226 can add information of one of these batteries to the stock information. The stock information relay unit 206 of the relay apparatus 200 having received the stock information from the managing apparatus 220 transfers the stock information to the information terminal 240 by using the communication device 205. The route searching unit 248 receives this stock information from the relay apparatus 200 by using the communication device 245.

In step S507, the route searching unit 248 determines whether the selected station has a battery in stock based on the stock information obtained in step S506. If the selected station has a battery in stock ("YES" in step S507), the route searching unit 248 advances the process to step S508, and performs route search using this battery. If the selected station has no battery in stock ("NO" in step S507), the route searching unit 248 advances the process to step S511, and reselects a station.

In step S508, the route searching unit 248 selects the charge amount of one of the batteries found to be stocked in step S507. The charge amount selected in this step will be called a selected charge amount.

In step S509, the route searching unit 248 recursively executes the route searching process by using the selected station as the determination target position, and the selected charge amount as the determination target residual amount. In other words, the route searching unit 248 determines whether the moving body EV can reach the destination either directly or via a station by using the battery having the selected charge amount from the selected station. If the result of execution in step S509 indicates that the moving body EV can reach the destination, a final candidate route by which the moving body EV reaches the destination by using the battery having the selected charge amount from the selected station is obtained. If the moving body EV cannot reach the destination, no such route is obtained.

In step S510, the route searching unit 248 determines whether a charge amount not selected in step S508 exists among the batteries found to be stocked in step S507. If there is an unselected charge amount ("YES" in step S510), the route searching unit 248 returns the process to step S508, selects one unselected charge amount, and recursively and periodically reexecutes the route searching process. If there is no unselected charge amount ("NO" in step S510), the route searching unit 248 advances the process to step S511, and reselects a station.

In step S511, the route searching unit 248 determines whether a station not selected in step S504 exists among the stations found to satisfy the station search conditions in step S502. If there is an unselected station ("YES" in step S511), the route searching unit 248 advances the process to step S512, and selects a new station. If there is no unselected station ("NO" in step S511), the route searching unit 248 terminates the process.

In step S512, the route searching unit 248 deletes the route from the determination target position to the selected station from the temporary candidate route. At this point of time, the temporary candidate route has extended to the selected station. In this step, therefore, in order to select a new station, the route searching unit 248 returns the temporary candidate route to the determination target position, and makes it possible to extend the route to a new selected station. After that, the route searching unit 248 returns the process to step S504, and selects a new station.

A case in which the above-described route providing process is applied to the positional relationship between the moving body EV and others shown in FIG. 1 and the practical examples of the battery information shown in FIG. 2 will be explained. As described above, the route providing process is recursively performed. Therefore, the route searching process executed in step S405 of FIG. 4 will be called a first-stage route searching process, a route searching process recursively called in the first-stage route searching process will be called a second-stage route searching process, a next route searching process will be called a third-stage route searching process, and so on.

First, in the first-stage route searching process, the station ST1 is the selected station, and the battery charge amounts contained in the stock information are 30%, 70%, and 100%. In the second-stage route searching process in which the station ST1 is the determination target position and 30% is the determination target residual amount, the moving body EV cannot reach the destination DST and any station. Therefore, the process is terminated without performing the third-stage route searching process.

In the second-stage route searching process in which the station ST1 is the determination target position and 70% is the determination target residual amount, the moving body EV cannot directly reach the destination DST but can reach the station ST2, so the station ST2 becomes the selected station. Since 80% is the only charge amount of batteries stocked in the station ST2, the third-stage route searching process in which the station ST2 is the determination target position and 80% is the determination target residual amount is executed. In the third-stage route searching process, the moving body EV can directly reach the destination DST with the battery having a residual amount of 80% from the station ST2. Consequently, a final candidate route is generated in which the moving body EV changes the battery with a battery having a charge amount of 70% in the station ST1 from the current position, changes the battery with a battery having a charge amount of 60% in the station ST2 after that, and then reaches the destination DST.

After that, the route searching unit 248 continues the processing, and generates the following final candidate route. Note that the station ST1 or the like is simplified as ST1 or the like, and the charge amount of a battery to be provided is shown in the parentheses.

Route 1: current position ST1→(70%)→ST2 (60%)→destination

Route 2: current position ST1→(100%)→ST2 (60%)→destination

Route 3: current position ST1→(100%)→ST3 (100%)→destination

If the stock information obtained in step S506 contains the amount of money of a battery, the route searching unit 248 may also calculate the total amount of money of batteries necessary to reach the destination DST through the final candidate route in step S514. In the above example, route 2 is equal to route 1, but has a larger total amount of money of batteries. In this case, the route searching unit 248 can exclude a route like this (a route having the total amount of money of batteries higher than those of other identical routes) from the final candidate routes. In step S406, the route providing unit 247 can present the total amount of money of batteries in each route to the user, together with a list of the final candidate routes. This enables the user to use the total amount of money of batteries as a route determination criterion.

Figure 6:
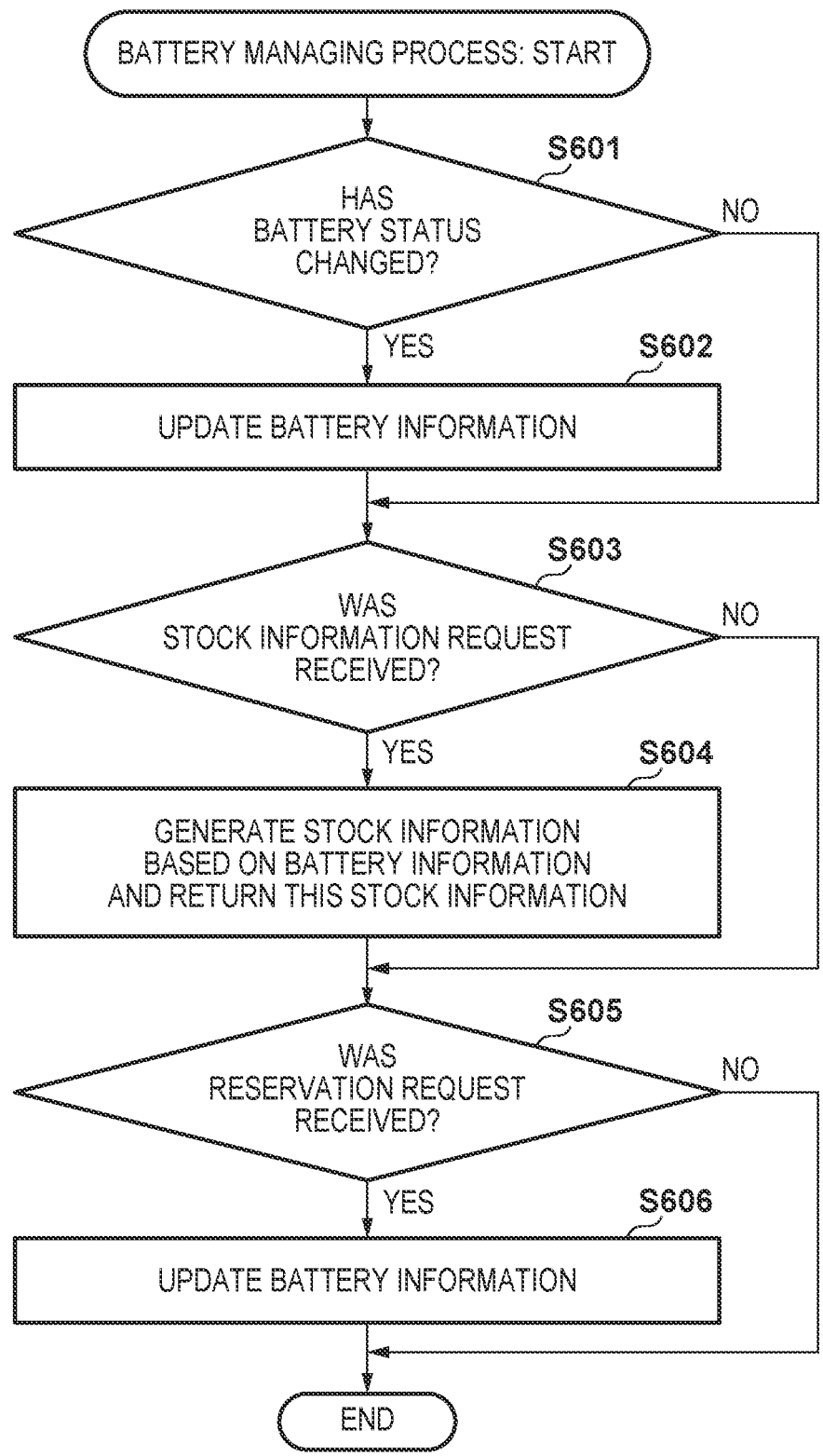
FIG. 6 is a flowchart for explaining an example of a battery managing process of the embodiment.

Details of the operation of the managing apparatus 220 installed in the station ST1 will be explained below with reference to a flowchart shown in FIG. 6. The managing apparatus 220 repeats the following processing.

In step S601, the battery information managing unit 226 determines whether the status of the battery 229 has changed. If the status has changed ("YES" in step S601), the battery information managing unit 226 updates the battery information stored in the battery information DB 227 in step S602, and advances the process to step S603 after that. If the status has not changed ("NO" in step S601), the battery information managing unit 226 immediately advances the process to step S603.

Details of step S602 will be explained. When the battery 229 is newly rented, the battery information managing unit 226 deletes the information of the battery from the battery information. When the battery 229 is returned, the battery information managing unit 226 adds the information of the battery to the battery information. "Status" of the added information is charging, and "charge amount" is the residual amount of the returned battery. If the charge amount of the battery 229 has changed, the battery information managing unit 226 updates "charge amount" of the battery. If the charge status of the battery 229 has changed, the battery information managing unit 226 updates "status" of the battery. The battery information managing unit 226 can automatically obtain the information about the change in status of the battery 229 from the charger 230, and can also obtain information manually input by the user of the managing apparatus 220 by using the input device 224.

In step S603, the battery information managing unit 226 determines whether a request for the stock information is received from the relay apparatus 200. If the request is received ("YES" in step S603), the battery information managing unit 226 performs step S604, and advances the process to step S605 after that. If the request is not received ("NO" in step S603), the battery information managing unit 226 immediately advances the process to step S605.

In step S604, the battery information managing unit 226 reads out information of an unreserved battery whose charge amount is not 0% from the battery information stored in the battery information DB 227, and returns this information as the stock information to the relay apparatus 200. If there is no unreserved battery having a charge amount of not 0%, the battery information managing unit 226 returns this information as the stock information.

In step S605, the battery information managing unit 226 determines whether a reservation request is received from the relay apparatus 200. If the request is received ("YES" in step S605), the battery information managing unit 226 updates the battery information stored in the battery information DB 227 in step S606, and terminates the process after that. If the request is not received ("NO" in step S605), the battery information managing unit 226 immediately terminates the process.

Details of step S606 will be explained below. The battery information managing unit 226 changes "reservation target" of the battery designated by the reservation request to the ID of a moving body associated with the reservation request, and also changes "expected time of delivery" to the time designated by the reservation request. The reserved battery satisfies the needs of the person having made the reservation if the battery has a charge amount at that point of time. Therefore, the battery information managing unit 226 may also stop charging the reserved battery. For example, the battery information managing unit 226 can automatically stop charging the reserved battery by controlling the charger 230, and can also encourage the user of the managing apparatus 220 to stop charging the battery by using the display device 223. By stopping charging of the battery, it is possible to prolong the life of the battery, and reduce the power consumption amount of the station.

When canceling the route guidance of the information terminal 240 of the moving body EV, the information terminal 240 can request cancellation of battery reservation to a station via which this route goes. The battery information managing unit 226 of the managing apparatus 220 having received the reservation cancellation request changes "reservation target" of the battery reserved by the moving body EV to none, and deletes "expected time of delivery".

In the above-described embodiment, a moving body can reach the destination even when a station rents a battery having a charge amount less than full charge to the moving body, so the battery operation rate in the station can be improved. Also, the driver of the moving body can get the guidance of a route through which the moving body can reach the destination more inexpensively.

Modifications of the above-described embodiment will be explained below. In the above embodiment, the battery information managing unit 226 of the managing apparatus 220 returns stock information at the point of time at which a request for the stock information is received. However, a station rents a battery when the moving body EV actually arrives at the station, and the charge amount of the battery existing in the station at that point of time is larger than that when the response is returned. Therefore, the battery information managing unit 226 of the managing apparatus 220 may also predict the residual amount of a battery at the point of time at which the moving body EV arrives at the station, and return the predicted charge amount by adding it to the stock information.

For example, the above-described embodiment is changed as follows. When adding the route to the selected station to the premise candidate routes in step S505 of FIG. 5A, the time of arrival at the selected station is predicted based on the position of the selected station. In step S506, the route searching unit 248 adds the time of arrival at the selected station to the request for the battery stock information in the selected station. In step S604 of FIG. 6, the battery information managing unit 226 of the managing apparatus 220 predicts a change in battery information at this time of arrival, generates stock information based on the changed battery information, and returns this stock information.

As an example, route 3 of the above-described practical example will be explained. In route 3, the moving body EV changes the battery with a battery having a charge amount of 100% in the station ST1 from the current position, changes the battery with a battery having a charge amount of 100% in the station ST3, and moves to the destination. Assume that the moving body EV arrives at the station ST3 in 30 min in this route. In this case, the battery information managing unit 226 predicts a change in battery information in a future of 30 min. Assume that the charge amount of battery ID "0016" changes from 0% to 30% over 30 min. Accordingly, the battery information managing unit 226 changes the battery residual amount to be contained in the stock information to 100% and 30%. In this case, the moving body EV can reach the destination DST by changing the battery with a battery having a charge amount of 30% in the station ST3, that is, can reach the destination DST more inexpensively.

As explained with reference to FIG. 1, the moving body EV can reach the destination DST from the station ST3 by the battery having a charge amount of 20%. Therefore, the route searching unit 248 of the information terminal 240 may also request the managing apparatus 220 to stop charging the reserved battery ("0016") at 20%. In response to the request, the battery information managing unit 226 stops charging when the charge amount of the battery having battery ID "0016" has reached 20%.

In the above-described embodiment, all stations accept battery reservations. However, battery reservations may not be accepted depending on the policy of operation of the station. Therefore, the managing apparatus 220 installed in a station where batteries cannot be reserved returns the following stock information.

First, the battery information managing unit 226 of the managing apparatus 220 obtains a request for the stock information and the time of arrival of the moving body EV, in the same manner as in the abovementioned modification. After that, the battery information managing unit 226 predicts the number of moving bodies which may arrive at the station before the time of arrival. This prediction may also be performed based on, for example, the number of moving bodies positioned within a range obtained by multiplying a time until the time of arrival by a predetermined value. Then, the battery information managing unit 226 generates stock information by assuming that batteries do not exist in descending order of the charge amount in number equal to the predicted number. For the battery information 303, for example, it is assumed that two moving bodies which can reach the station ST3 before the time of arrival of the moving body EV currently performing route search exist around the station ST3. In this case, the battery information managing unit 226 generates stock information by assuming that a battery having a charge amount of 100% is rented. The stock information generated in this manner indicates a minimum value of the battery charge amount which the user of the moving body EV currently performing route search can certainly borrow when the moving body EV arrives at the station ST3. This prevents the moving body EV from becoming unable to reach the destination because the charge amount is insufficient.

In the above-described embodiment, the information terminal 240 includes the route searching unit 248. Instead, the relay apparatus 200 may include the route searching unit 248. In this case, data exchange between the route providing unit 247 of the information terminal 240 and the route searching unit 248 of the relay apparatus 200 is performed by the communication device 245 of the information terminal 240 and the communication device 205 of the relay apparatus 200 by transmitting and receiving data across the communication network 260. For example, the communication device 205 of the relay apparatus 200 transmits the final candidate route found by the route searching unit 248 of the relay apparatus 200 to the information terminal 240. The relay apparatus 200 executes route search, and hence can also be called a route searching apparatus. In addition, the battery 249 can include a processor, a memory, and a communication device in this case. The memory of the battery 249 stores, for example, the current charge amount, the charge log, and the user information. Instead of transmitting the current residual amount of the battery 249 from the information terminal 240 to the relay apparatus 200, the battery 249 can transmit the current residual amount to the relay apparatus 200 by using its own communication device.

In the above-described embodiment, the managing apparatus 220 installed in a station includes the battery information managing unit 226, the battery information DB 227, and the money amount information DB 228. Instead, the relay apparatus 200 can include these elements. In this case, the managing apparatus 220 transmits a change in battery status to the battery information managing unit 226 of the relay apparatus 200 across the communication network 260. The relay apparatus 200 executes management of the battery information, and hence can be called a battery information managing apparatus.

In the above-described embodiment, the information terminal 240 and the managing apparatus 220 communicate with each other via the relay apparatus 200. Instead, the information terminal 240 and the managing apparatus 220 can directly communicate with each other without being relayed by the relay apparatus 200. For example, the route searching unit 248 of the information terminal 240 directly obtains the stock information from the selected station in step S506 of FIG. 5B, and directly transmits the reservation request to each station in step S408 of FIG. 4.

The above-described embodiment and the effects will be summarized below.

[Item 1]

A route searching apparatus (240) for searching for a route through which a moving body (EV) which moves by electric energy from a changeable battery (249) reaches a destination (DST), the apparatus comprising a position obtaining unit (246) configured to obtain a current position of the moving body, a stock information obtaining unit (248) configured to obtain stock information of a changeable battery (229) in a battery changing station (ST1 to ST3), an estimating unit (248) configured to estimate a movable range based on a residual amount of a changeable battery mounted in the moving body, and a searching unit (248) configured to search for a route through which the moving body reaches the destination via the battery changing station, based on the stock information and the movable range.

According to item 1, the moving body can reach the destination even when the station rents a battery having a charge amount less than full charge to the moving body. This can improve the battery operation rate in the station. Also, the driver of the moving body can get the guidance of a route through which the moving body reaches the destination more inexpensively.

[Item 2]

The route searching apparatus according to item 1, wherein the stock information includes a charge amount of a changeable battery in a battery changing station.

According to item 2, route search can be performed by taking account of the charge amount of a changeable battery.

[Item 3]

The route searching apparatus according to item 2, wherein the searching unit determines whether the moving body can reach the destination in a case where the battery is changed with a changeable battery having a predetermined charge amount in the battery changing station.

According to item 3, route search can be performed by taking account of a changeable battery having a predetermined charge amount.

[Item 4]

The route searching apparatus according to any one of items 1 to 3, further comprising a predicting unit configured to predict a time of arrival at a battery changing station based on a position of the battery changing station, wherein the stock information obtaining unit obtains stock information of the battery changing station at the time of arrival.

According to item 4, the battery operation rate can further be improved.

[Item 5]

The route searching apparatus according to any one of items 1 to 4, wherein the stock information includes money amount information (228) of a changeable battery.

According to item 5, an amount of money necessary for the found route can be calculated.

[Item 6]

The route searching apparatus according to item 5, wherein the money amount information includes an amount of money calculated by a method which raises a price of a changeable battery as a charge amount of the changeable battery increases.

According to item 6, an incentive to select a battery having a small charge amount works.

[Item 7]

The route searching apparatus according to any one of items 1 to 6, further comprising a display control unit (247) configured to cause a display device (243) to display a route found by the searching unit.

According to item 7, the route searching apparatus can be brought into a moving body.

[Item 8]

The route searching apparatus according to any one of items 1 to 6, further comprising a transmitting unit (205) configured to transmit a route found by the searching unit to an information terminal which moves together with the moving body.

According to item 8, the server can perform a route searching process, so the power consumption of the information terminal can be reduced.

[Item 9]

A program for causing a computer to function as each unit of a route searching apparatus according to any one of items 1 to 8.

According to item 9, a route searching apparatus can be implemented by installing the program in the computer.

[Item 10]

A battery information managing apparatus (220) to be installed in a battery changing station (ST1 to ST3) for storing a changeable battery (229), the apparatus including a stock information obtaining unit (226) configured to obtain stock information of the changeable battery, a transmitting unit (225) configured to transmit the stock information to an information terminal which moves together with a moving body in which a changeable battery is mounted, and a receiving unit (225) configured to receive a changeable battery reservation request from the information terminal, wherein the stock information includes information of a battery having a charge amount less than full charge among changeable batteries stored in the battery changing station, and the stock information obtaining unit updates the stock information when a changeable battery is reserved.

According to item 10, the moving body can reach the destination even when the station rents a battery having a charge amount less than full charge to the moving body. This can improve the battery operation rate in the station. Also, the driver can get the guidance of a route through which the moving body reaches the destination more inexpensively.

[Item 11]

The battery information managing apparatus according to item 10, wherein the stock information includes a charge amount of a changeable battery in a battery changing station.

According to item 11, route search can be performed by taking account of the charge amount of a changeable battery.

[Item 12]

The battery information managing apparatus according to item 10 or 11, further comprising a stock information predicting unit (226) configured to predict future stock information of the changeable battery.

According to item 12, the battery operation rate can further be improved.

[Item 13]

The battery information managing apparatus according to any one of items 10 to 12, wherein the stock information includes money amount information (228) of a changeable battery.

According to item 13, an amount of money necessary for the found route can be calculated.

[Item 14]

The battery information managing apparatus according to item 13, wherein the money amount information includes an amount of money calculated by a method which raises a price of a changeable battery as a charge amount of the changeable battery increases.

According to item 14, an incentive to select a battery having a small charge amount works.

The present invention is not limited to the above-described embodiments, and various changes and modifications can be made within the spirit and scope of the present invention. Therefore, to apprise the public of the scope of the present invention, the following claims are made.

The invention claimed is:

1. A route searching apparatus for searching for a route through which a moving body which moves by electric energy from a changeable battery reaches a destination, the apparatus comprising:

at least one processor circuit with a memory comprising instructions, that when executed by the processor circuit, cause the processor circuit to at least:

obtain a current position of the moving body;

obtain a designation of a residual amount of the changeable battery which should remain when the moving body arrives at the destination;

predict a time of arrival at a battery changing station based on a position of the battery changing station;

obtain stock information of a plurality of stored changeable batteries in the battery changing station at the time of arrival;

estimate a movable range based on a residual amount of the changeable battery mounted in the moving body; and search for a route through which the moving body reaches the destination via the battery changing station, based on the designated residual amount, the stock information and the movable range, wherein the stock information includes a charge amount of each of the changeable batteries in the battery changing station, and wherein the instructions cause the processor circuit to, if the stored changeable batteries have different charge amounts, determine, for each charge amount, whether the moving body can reach the destination in a case where the changeable battery of the moving body is exchanged with one of the stored changeable batteries having the respective charge amount, and where the stored changeable batteries have a same charge amount, the instructions do not determine whether the moving body can reach the destination in a case where the changeable battery of the moving body is exchanged with one of the stored changeable batteries.

2. The route searching apparatus according to claim 1, wherein the stock information includes money amount information for each of the stored changeable batteries.

3. The route searching apparatus according to claim 2, wherein the money amount information includes an amount of money calculated by a method which raises a price of a respective one of the stored changeable batteries as a charge amount of the respective one of the changeable batteries increases.

4. The route searching apparatus according to claim 1, wherein the memory further comprises instructions, that when executed by the processor circuit, cause the processor circuit to cause a display device to display a route found by the processor circuit.

5. The route searching apparatus according to claim 1, wherein the memory further comprises instructions, that when executed by the processor circuit, cause the processor circuit to transmit a route found by the processor circuit to an information terminal which moves together with the moving body.

6. A non-transitory storage medium storing a program for causing a computer to function as the route searching apparatus according to claim 1.

7. The route searching apparatus according to claim 1, wherein estimating a movable range based on a residual amount of the changeable battery mounted in the moving body includes estimating the movable range based on the residual amount of the changeable battery mounted in the moving body and a safety factor.

8. The route searching apparatus according to claim 1, wherein the memory further comprises instructions, that when executed by the processor circuit, cause the processor circuit to send a reservation request for a desired changeable battery to a battery changing station, the reservation request including a battery amount required of the desired changeable battery of the battery changing station, and the reservation request further including, if the required battery amount is not a full charge amount, an instruction to stop charging the desired changeable battery of the battery changing station when the battery amount of the desired changeable battery reaches the required battery amount.

* * * * *